Patented Feb. 6, 1951

2,540,104

UNITED STATES PATENT OFFICE 2,540,104

PROCESS FOR PREPARING AROMATIC AMINO HYDROXY ACIDS

Leonard Doub, Detroit, Mich., assignor to Parke, Davis & Company, Detroit, Mich., a corporation of Michigan No Drawing. Application October 14, 1949, Serial No. 121,447

3 Claims. (Cl. 260—519)

This invention relates to a process for the preparation of aromatic amino hydroxy acids. More particularly, the invention relates to a process for the preparation of 4-amino-2-hydroxybenzoic acid.

4 Amino-2-hydroxybenzoic acid has recently attained commercial importance due to the discovery of its efficacy in the treatment of tuberculosis. Several different methods have been proposed for the commercial preparation of this valuable chemical from readily available starting materials. However, most of the processes are both expensive and laborious due to the many steps involved and are therefore unsuitable for the commercial production of large quantities of the desired amino hydroxy acid. One of the most feasible and widely used of the currently used commercial methods is a one-step process which consists in the reaction of m-aminophenol with a water soluble bicarbonate in an aqueous medium under pressure and at an elevated temperature in the presence of gaseous carbon dioxide. The disadvantages of this method lie in the low yields of the desired 4-amino-2-hydroxybenzoic acid and the formation of considerable quantities of a dicarboxylic acid by-product which is difficult to remove.

It is an object of the invention to provide a method for obtaining high yields of 4-amino-2-hydroxybenzoic acid in the reaction of m-aminophenol with a water soluble bicarbonate in an aqueous medium under pressure and at an elevated temperature in the presence of gaseous carbon dioxide.

It is also an object of the invention to provide a method for carrying out the reaction of m-aminophenol with a water soluble bicarbonate in an aqueous medium under a positive pressure of carbon dioxide and at an elevated temperature to obtain 4-amino-2-hydroxybenzoic acid which is relatively free from the contaminating dicarboxylic acid by-product.

These and other objects which will appear hereinafter are realized by the addition of boric acid to the aqueous reaction mixture containing m-aminophenol and the water soluble bicarbonate. Carrying the reaction out in the presence of boric acid results in a 50% increase in the yield of the 4-amino-2-hydroxybenzoic acid with an attendant decrease to about one-fifth to one-tenth of the amount of contaminating dicarboxylic acid by-product.

In carrying out the process of the present invention at least one equivalent of boric acid should be used for each equivalent of the m-aminophenol. So far as I have been able to ascertain there is no critical upper limit on the amount of boric acid which can be used and I have employed as much as 4 to 5 equivalents without any material influence upon the results obtained. The optimal results are obtained when 1.8 to 2.2 equivalents of boric acid are used.

The reaction can be effected under a rather wide range of conditions. For example, the temperature can be varied between 60 and 200° C. with the optimal results being obtained at 65 to 95° C. The carbon dioxide can be supplied to the reaction mixture under widely varying pressures from a few lbs./sq. in. to several thousand lbs./sq. in. In general, a pressure above about 20 lbs./sq. in. should be used with a pressure of about 70 lbs./sq. in. being the most favorable from a practical standpoint. Because the yield increases with the pressure, the commercial feasibility of the process is limited in this respect only by the availability of pressure equipment.

The reaction time can also be varied but it is more or less dependent upon the temperature and the carbon dioxide pressure employed. With a temperature of about 90° C. and a carbon dioxide pressure of 70 lbs./sq. in. a 68–70% yield of the 4-amino-2-hydroxybenzoic acid is obtained within twenty-four hours. Under these same conditions an 80% yield of the desired product is produced in forty-eight hours. Decreasing the temperature and pressure increases the reaction time while increasing the temperature and pressure lessens the reaction time.

Best results are obtained when the concentration of the water soluble bicarbonate in the reaction mixture is maintained near its maximum solubility. The more water soluble bicarbonates such as ammonium bicarbonate and the alkali metal bicarbonates are preferred. Potassium bicarbonate gives particularly good results because of its high water solubility. The bicarbonates can be added to the reaction mixture as such or generated in situ by the action of the gaseous carbon dioxide on alkali metal hydroxides or carbonates.

The invention is illustrated by the following examples.

Example 1

A mixture consisting of 300 parts of potassium bicarbonate, 130 parts of m-aminophenol, 150 parts of boric acid and 300 parts of water is heated in a rocking-type pressure vessel at 92° C. for 96 hours under a carbon dioxide pressure of 70 lbs./sq. in. At the end of the reaction time the vessel and contents are cooled as soon as possible to 30° C., the reaction mixture removed and diluted with 800 parts of water. 800 parts of concentrated hydrochloric acid are added carefully to prevent loss by foaming. The precipitate is filtered off and suspended in 800 parts of 10% hydrochloric acid. The solid is collected, suspended in methanol containing 10% aqueous hydrochloric acid, the solid collected and the methanol wash repeated. The yield of the hydrochloride salt of 4-amino-2-hydroxybenzoic acid thus obtained is 225 parts or 84.5%. The product contains 1.8% of the contaminating dicarboxylic acid. The free base of 4-amino-2-hydroxybenzoic acid is obtained by treatment of the hydrochloride salt with one equivalent of alkali preferably in the presence of a phosphate buffer.

When the reaction described above is carried out omitting the boric acid, a 54% yield of the hydrochloride salt of 4-amino-2-hydroxybenzoic acid is obtained. The product obtained by this method contains abut 15% of the contaminating dicarboxylic acid by-product.

The following table summarizes the results obtained in several pairs of experiments in which the reaction was carried out under the same conditions in the presence and absence of boric acid.

| Parts of m-amino phenol | Parts of bicarbonate | Temperature, °C. | Pressure of carbon dioxide, lbs. | Time hrs. | Equivalents of boric acid per equivalent of m-amino phenol | Percent of crude product [1] | |
|---|---|---|---|---|---|---|---|
| | | | | | | With boric acid | Without boric acid |
| 1.3 | 6 (KHCO$_3$) | 90-92 | 300 | 70 | 1.5 | 82.5 | 55 |
| 1.3 | 6 (KHCO$_3$) | 90 | ca. 70 (sealed tube) | 46 | 1.5 | 71 | 51 |
| 130 | 600 (KHCO$_3$) | 90-95 | 35 | 88 | 2.0 | 76 | 57 |
| 82 | 156 (KHCO$_3$) | 90 | 900 | 120 | 2.0 | 96.5 | 65 |
| 1.3 | 6 (KHCO$_3$) | 110 | 70 | 50 | 2.0 | 73.5 | 49 |

[1] The crude product obtained when no borac acid was used contained from 10 to 15% dicarboxylic acid by-product. When boric acid was used, the amounts of contaminating dicrahoxylic acid by-product ranged from only 1 to 2%. The respective amounts of pure hydrochloride salt of 4-amino-2-hydroxybenzoic acid show consequently about a 50% increase in the yield of the desired product.

Example 2

A mixture of 54.5 parts of m-aminophenol, 107 parts of potassium carbonate, 93 parts of boric acid and 150 parts of water is heated in a rocking-type pressure vessel at 90° C. for 120 hours and under a carbon dioxide pressure of 300 lbs./sq. in. At the end of the reaction time the vessel and contents are cooled as soon as possible and the reaction mixture is treated as in Example 1. The yield of the hydrochloride salt of 4-amino-2-hydroxybenzoic acid is 84%.

Example 3

82 parts by weight of m-aminophenol, 107 parts of potassium carbonate, 93 parts of boric acid and 150 parts of water are placed in an autoclave and heated to 90° C. under 70 lbs. of carbon dioxide pressure for 48 hours with agitation. The bomb is cooled as rapidly as possible to 30° C., the reaction mixture removed and diluted with 500 parts of water. 500 parts of concentrated hydrochloric acid are added carefully to prevent loss by foaming. The precipitate is filtered off and suspended in 500 parts of 10% hydrochloric acid. The solid is filtered and suspended in methanol containing 10% aqueous hydrochloric acid. The mixture is filtered and the methanol wash repeated. The final solid is dried in vacuo. The yield of the hydrochloride salt of 4-amino-2-hydroxybenzoic acid is 78.5%.

Example 4

A mixture of 2.6 parts of m-aminophenol, 2.8 parts of ammonium bicarbonate, 4.7 parts of water and 2.9 parts of boric acid is heated in a small pressure vessel at 90° C. for 52 hours and under a carbon dioxide pressure of 70 lbs./sq. in. At the end of this time the vessel and contents are cooled as soon as possible, the reaction mixture removed and treated the same way as in Example 1. Yield of hydrochloride salt of 4-amino-2-hydroxybenzoic acid is 81.0%.

Example 5

260 parts of m-aminophenol, 800 parts of potassium bicarbonate, and 300 parts of boric acid, and 1000 parts of water are heated together in a pressure cooker at 95° C. for 144 hours at a pressure of 37 lbs./sq. in. At the end of the reaction time the vessel is cooled as soon as possible and the reaction mixture is treated as in Example 1. The yield of the hydrochloride salt of 4-amino-2-hydroxybenzoic acid is 78.4%.

Example 6

A mixture of 6 parts of potassium bicarbonate, 1.3 parts of m-aminophenol, 1.5 parts of boric acid and ten parts of water is heated together in a small pressure vessel at 110° C. for 50 hours under a carbon dioxide pressure of 70 lbs./sq. in. The vessel is cooled as soon as possible and the reaction mixture is treated as in Example 1. The yield of the hydrochloride salt of 4-amino-2-hydroxybenzoic acid is 73.5%.

Example 7

A mixture of 1.3 parts of m-aminophenol, 6 parts of potassium bicarbonate, 1.5 parts of boric acid, and ten parts of water is heated in a small bomb at 95-97° C. for 30 hours under a carbon dioxide pressure of 300 lbs./sq. in. At the end of the reaction time the vessel is cooled as soon as possible and the mixture is treated as in Example 1. The yield of the hydrochloride salt of 4-amino-2-hydroxybenzoic acid is 74%.

Example 8

A mixture of 0.65 part of m-aminophenol, 3 parts of potassium bicarbonate, 0.74 part of boric acid, and five parts of water is heated in a sealed tube at 90° C. for 40 hours. At the end of this time the tube is cooled to room temperature and the reaction mixture is treated as in Example 1. The yield of the hydrochloride salt of the 4-amino-2-hydroxybenzoic acid is 69.2%.

Example 9

A mixture of 3 parts of potassium bicarbonate, 0.65 part of m-aminophenol, 0.37 part of boric acid and five parts of water is heated in a sealed tube at 90° C. for 40 hours. At the end of this time the tube is cooled as soon as possible and the reaction mixture is treated as in Example 1. The yield of the hydrochloride salt of the 4-amino-2-hydroxybenzoic acid is 61.3%.

*Example 10*

A mixture of 15 parts of sodium bicarbonate, 2 parts of m-aminophenol, 6 parts of boric acid and 50 parts of water is heated in a sealed tube at 91° C. for 120 hours. At the end of this time the tube is cooled as soon as possible and the reaction mixture is treated as in Example 1. The yield of the hydrochloride salt of the 4-amino-2-hydroxybenzoic acid is 76%.

*Example 11*

A mixture of 3.0 parts of potassium bicarbonate, 0.65 part of m-aminophenol, 1.5 parts of boric acid and 5 parts of water is heated in a sealed tube at 90° C. for 66 hours. At the end of this time the tube is cooled as soon as possible and the reaction mixture is treated as in Example 1. The yield of the hydrochloride salt of the 4-amino-2-hydroxybenzoic acid is 61.3%.

*Example 12*

A mixture of 82 parts of m-aminophenol, 156 parts of potassium carbonate, 93 parts of boric acid and 150 parts of water is heated in an autoclave with stirring at 90° C. for 120 hours and under a carbon dioxide pressure of 900 lbs./sq. in. The vessel and contents are cooled and the reaction mixture is treated as in Example 1. The yield of the hydrochloride salt of 4-amino-2-hydroxybenzoic acid is 96%.

*Example 13*

A mixture of 82 parts of m-aminophenol, 156 parts of potassium carbonate, 93 parts of boric acid and 150 parts of water is heated in an autoclave with stirring at 200° C. for one hour and under a carbon dioxide pressure of 1000 lbs./sq. in. The vessel and contents are cooled and the reaction mixture is treated as in Example 1. The yield of the hydrochloride salt of 4-amino-2-hydroxybenzoic acid is 73%.

*Example 14*

A mixture of 30 pounds of m-aminophenol, 40 pounds of potassium carbonate, 34 pounds of boric acid and 5 gallons of water is heated in a glass-lined kettle at 95° C. for 48 hours and under a carbon dioxide pressure of 60 lbs./sq. in. The contents of the kettle are cooled and treated as in Example 1. The yield of the hydrochloride salt of 4-amino-2-hydroxybenzoic acid is 80.7%.

What I claim is:

1. Process for obtaining 4-amino-2-hydroxybenzoic acid which comprises reacting m-aminophenol with a water soluble bicarbonate in an aqueous medium at a temperature between 60 and 200° C. in the presence of boric acid and under a positive pressure of carbon dioxide.

2. Process for obtaining 4-amino-2-hydroxybenzoic acid which comprises reacting m-aminophenol with a water soluble bicarbonate in an aqueous medium at a temperature between 60 and 200° C. in the presence of at least one equivalent of boric acid for each equivalent of m-aminophenol and under a carbon dioxide pressure above about 20 lbs./sq. in.

3. Process for obtaining 4-amino-2-hydroxybenzoic acid which comprises reacting m-aminophenol with an alkali metal bicarbonate in an aqueous medium at a temperature between 65 and 95° C. in the presence of 1.8 to 2.2 equivalents of boric acid for each equivalent of m-aminophenol and under a carbon dioxide pressure above about 20 lbs./sq. in.

LEONARD DOUB.

No references cited.